UNITED STATES PATENT OFFICE.

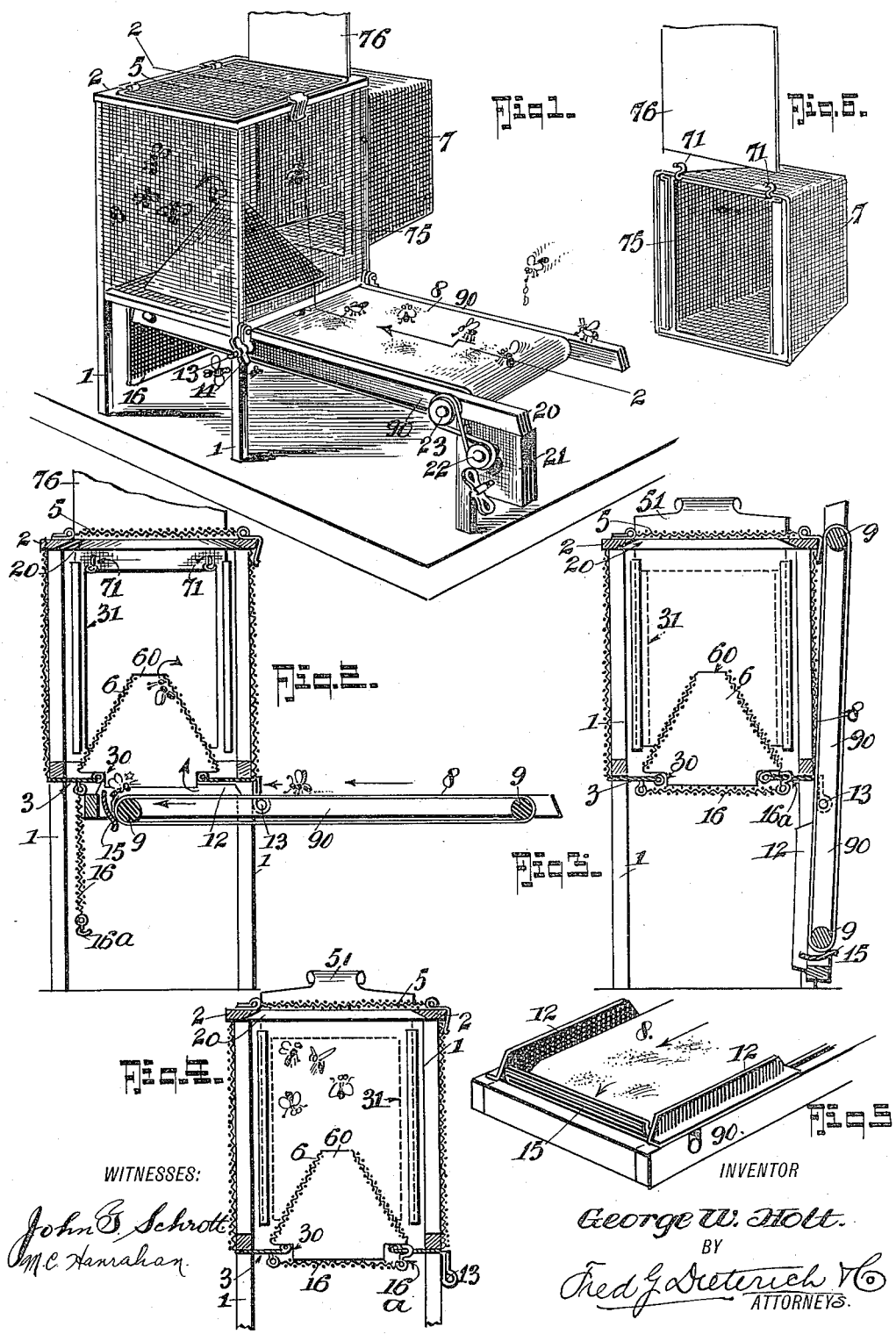

GEORGE WASHINGTON HOLT, OF POPLAR BLUFF, MISSOURI, ASSIGNOR, BY DIRECT AND MESNE ASSIGNMENTS, TO JUDSON PRICE, OF POPLAR BLUFF, MISSOURI.

FLY-TRAP.

1,159,384.    Specification of Letters Patent.    Patented Nov. 9, 1915.

Application filed August 11, 1914. Serial No. 856,189.

*To all whom it may concern:*

Be it known that I, GEORGE W. HOLT, residing at Poplar Bluff, in the county of Butler and State of Missouri, have invented a new and Improved Fly-Trap, of which the following is a specification.

This invention has reference to that class of fly traps in which is included an endless baited conveyer or belt for carrying the baited flies to the catching cage and my said invention primarily has for its object to provide an improved fly catching means of the general character stated, of a simple and economical construction, in which the several parts are so designed, that when not in use, they can be conveniently and compactly folded up for packing or shipping and correlatively so arranged that the operation of the destruction of the caught flies can be easily and quickly effected.

My invention also has for its purpose to provide a fly catcher in which is included means for positively preventing the escape of the flies caught upon the belt and from passing alive from the receiving mouth of the catching cone that forms a part of the trapping means.

With further objects in view, that will hereinafter appear my invention is an improved fly trap that embodies the peculiar features of construction and the novel arrangement of parts hereinafter fully explained, specifically pointed out in the appended claims and illustrated in the accompanying drawing, in which:

Figure 1 is a perspective view of my improved fly trap, the parts being shown at their operative position. Fig. 2 is a vertical longitudinal section thereof on the line 2—2 on Fig. 1. Fig. 3 is a similar view thereof and shows the parts folded for transportation or storage. Fig. 4 is a vertical section of the fly holder, the conveyer being omitted and the throatway of the catching chamber shown closed. Fig. 5 is a detail perspective view of the inner or delivery edge of the conveyer and the guard devices carried thereby for causing the flies to positively enter the gathering cone and to prevent their escape over the delivering end of the said conveyer. Fig. 6 is a detail view of one of the supplemental catcher boxes hereinafter referred to.

In carrying out my invention, I employ a fly holding cage or chamber that is formed of four standards or legs 1—1 which are joined, at the upper end, with a top board 2, having a central opening 20 through which the caught flies are discharged and normally the said opening 20 is closed by a screen cover 5 hinged to the said top board 2, as shown.

3 designates the bottom of the holding chamber and it has a central opening 30 through which the flies pass as they are trapped in the manner presently explained.

The sides and the ends of the cage or holder are formed by bending a screen wire body around the standards 1—1 and securing the same thereto as shown.

6 designates a conical tube that is mounted over the opening 30 in the bottom 3 of the holder through which the trapped flies pass into the said holder.

To provide for catching a large number of flies, supplemental holders 7 are provided, they being also formed of wire screen and the said holders 7 are attached to the sides of the main holder by the bent hanger fingers 71 that engage the wire mesh of the main or body holder when the supplemental devices are placed in position for use.

When using the supplemental holder before mentioned its front side has a receiving opening 75 and a slidable gate 76 for closing such opening when the holder is removed from the main holder, it being understood that when the supplemental boxes or holders are used the ends of the main holder also have openings 51 controlled by slide gates, as shown.

8 designates the endless conveyer belt, which in my invention forms the catching element since the same when set up for use is coated with sugar or other substance that attracts the flies, and the said belt passes over rollers 9—9 detachably mounted in a rectangular frame whose opposite side arms 90 are removably mounted and pivotally supported near their front ends between the front legs 1—1 of the main or catcher frame, upon a cross bolt 13 that passes through the said legs and the side arms and is secured by a clamp nut 14, as shown.

By mounting the conveyer frame in the manner stated, the said conveyer is held with its front end over the fly entrance or opening 30 by the weight of the outer end when at the lowered position and the same frame, together with the endless conveyer, may be readily detached from the fly holding chamber when it is desired to destroy the caught flies.

By now referring more particularly to Fig. 2 of the drawing, it will be noticed that the conical member 6 has a restricted inlet or throatway 60 and that the inner or discharging end of the conveyer extends under the said throatway to such distance that the flies as they become freed when they pass beyond the bottom plate of the holding chamber and the closed bottom portion of the cone 6, may readily pass up into the said cone from which they pass, through the restricted upper end of the said cone, into the main collecting chamber, in which they are contained until discharged through the opening in the upper end thereof.

To positively guide the flies and cause them to pass into the cone 6, side guide plates 12 are secured to the delivery end of the conveyer and they extend vertically up to the mouth of the receiving cone and to keep any of the flies from passing alive back with the belt, a transverse member or throat piece 15, is connected to the side guides 12, whose upper end extends up to near the bottom of the main chamber and whose lower end extends down over the under face of the front roll and forms, as it were, a closure member that crushes any flies that might pass over the inner end of the belt, it being understood that the latter drop off the belt as it passes to the outer or upgoing end of the conveyer.

16 designates a drop door hinged to the bottom of the fly holding chamber and the same, when the conveyer is not in the operative position, is swung up to close the bottom of the said chamber, a latch 16$^a$ being provided for holding the said door closed.

One of the side members of the conveyer frame has an extension 20 that forms a seat for a motor 21 which may be an electric or clock or any other suitable power device, and in practice the driven shaft 22 of the motor when set up for use is held in mesh with a gear 23 on the front belt driving roller 9.

From the foregoing description taken with the drawing the advantages and the operation of my invention will be readily apparent. When set up for use, as shown in Figs. 1 and 2, the flies, as they are gathered on the belt, are carried under the bottom of the fly holder toward the bottom opening and the restricted opening and the restricted throat in the receiving cone; and as they reach the said cone opening they fly up into the cone and from thence into the main catching chamber or holder, it being understood that the side guides on the inner end of the conveyer keep the flies from passing sidewise from the belt and the transverse or closure member located over the front of the inner end of the conveyer prevents any of the flies passing over the said end alive.

When it is desired to dump or destroy the caught flies the conveyer is removed from the holder by pulling out the pivot pin 13 and when it is desired to store up the entire device, (the motor being first removed) the conveyer frame is swung up to the vertical position, and held by a latch device, as shown in Fig. 3.

What I claim is:

1. In an insect trap, the combination of a holder having a door covered discharge opening in the top and an opening in the bottom for the passage of the trapped flies, a conical throatway to the said opening mounted over the opening in the said bottom, a hinged door pendent from the holder bottom for closing the said opening at times, of an endless conveyer, a frame upon which it is mounted removably and pivotally supported on the holder to swing to a vertical and to a horizontal position, the pivotal connection of the conveyer being relatively such with respect to the holder whereby when the said conveyer is at a horizontal or operative position the front end of the conveyer extends under the bottom of the holder and practically across the fly entrance thereto, means on the discharging end of the conveyer for guiding the flies to the said opening in the holder bottom and other means connected with the said guiding means that forms a retarder for keeping flies that might pass beyond the opening in the bottom of the holder from passing back with the conveyer.

2. In a fly trap; a trap cage having a bottom entrance, an endless conveyer projected beneath the said entrance and arranged to deliver flies to said entrance, said conveyer including a frame having a guard to close over said entrance to prevent the escape of the flies, means between the ends of the conveyer for pivotally securing said frame near the cage whereby the outwardly projected part of the conveyer will overbalance the part that projects beneath the cage to hold the said guard over the entrance to the cage.

GEORGE WASHINGTON HOLT.

Witnesses:
 E. C. WARREN,
 H. H. WILCOX.